United States Patent [19]

Schmidt et al.

[11] 3,903,056

[45] Sept. 2, 1975

[54] MODIFICATION OF CARBOXY-CONTAINING POLYMERS BY TREATMENT WITH CYCLIC SULFONIUM COMPOUNDS

[75] Inventors: Donald L. Schmidt; Hugh B. Smith, both of Midland, Mich.; Melvin J. Hatch, Socorro, N. Mex.; William E. Broxterman, Midland, Mich.

[73] Assignee: The Dow Chemical Company, Midland, Mich.

[22] Filed: Sept. 4, 1973

[21] Appl. No.: 393,855

[52] U.S. Cl............ 260/78.5; 117/132; 117/161 K; 117/161 UC; 260/47; 260/78.5 T; 260/79.3 M; 260/79.3 R; 260/29.6 H; 260/332.3 R
[51] Int. Cl.² .............. C08F 218/14; C08G 81/00; C08F 28/00
[58] Field of Search .......... 260/47, 79.3 R, 79.3 M, 260/78.5 T, 78.5 R, 332.3 R, 29.6 H

[56] References Cited
UNITED STATES PATENTS

| | | | |
|---|---|---|---|
| 3,544,499 | 12/1970 | Hatch et al. | 260/78.5 R X |
| 3,636,052 | 1/1972 | Hatch et al. | 260/47 R X |
| 3,660,431 | 5/1972 | Hatch et al. | 260/332.3 R |

*Primary Examiner*—Joseph L. Schofer
*Assistant Examiner*—Herbert J. Lilling
*Attorney, Agent, or Firm*—Chessie E. Rehberg

[57] ABSTRACT

Carboxy-containing polymers are usually water-soluble or water-sensitive. These hydrophilic properties can be reduced or eliminated by treatment with an S-aryl cyclic sulfonium compound of the formula

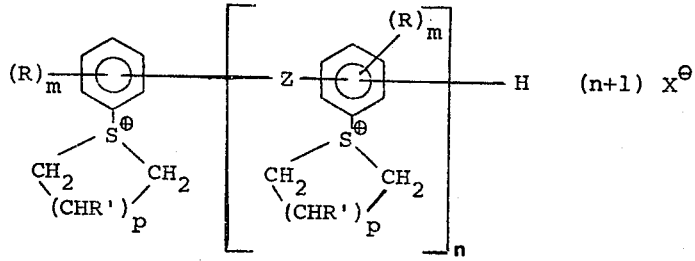

wherein each R independently is Cl, alkyl, alkoxy, phenyl, phenoxy or the like; each R' is independently H, Cl, alkyl, alkoxy, phenyl or phenoxy; Z is a linking element which may be a chemical bond, O, S, alkylene or alkylenedioxy, wherein said alkylene moieties may be interrupted by O, S, phenylene or the like; $m$ is 0–3, $n$ is 0 to about 4, $p$ is 2 or 3 and X is a neutralizing anion.

8 Claims, No Drawings

MODIFICATION OF CARBOXY-CONTAINING POLYMERS BY TREATMENT WITH CYCLIC SULFONIUM COMPOUNDS

BACKGROUND OF THE INVENTION

M. J. Hatch, in U.S. Pat. No. 3,544,499, disclosed that certain acyclic sulfonium compounds, i.e., compounds in which the sulfonium moiety is not a member of a ring, react with water-soluble carboxy-containing polymers to diminish or destroy their hydrophilic nature. His sulfonium compounds require a heat treatment of the order of 20–30 minutes at 125°–200°C. to produce the hydrophobing effect. Moreover, a volatile and odoriferous aliphatic sulfide is a by-product of the reaction. Although Hatch indicsted the possibility that the use of a cyclic sulfonium compound might eliminate the production of the obnoxious sulfide by-product, he did not explore this possibility.

Two of us (Broxterman and Schmidt) with S. Evani, in copending application Ser. No. 288,700, filed Sept. 13, 1972, have disclosed that cyclic sulfonium compounds somewhat similar to those here used, except that the aromatic rings to which the sulfonium rings are attached must have a phenolic OH group, can react with carboxy-containing polymers. The presence of the phenolic OH is essential because it forms a zwitterion system with the sulfonium moiety. When such a compound reacts with carboxy groups the phenolate group remains in the product. Its presence is objectionable because it is hydrophylic and it is sensitive to actinic light, thus rendering the product subject to discoloration by exposure to UV or sunlight.

In our copending application Ser. Nos. 382,976 and 382,977, filed July 26, 1973, cyclic sulfonium compounds are described which are useful in practicing the present invention. T. Nambura and N. Matsuhisi, Yakugaky Zasshi, 83, 642 (1963) have described additional compounds useful in the present invention and a method for their preparation. The methods described there and in our above copending applications are generally applicable to the production of the compounds used in practicing the present invention.

SUMMARY OF THE INVENTION

The hydrophilic properties of carboxy-containing polymers are substantially diminished or destroyed by reaction of the carboxy groups with a cyclic sulfonium compound of Formula I

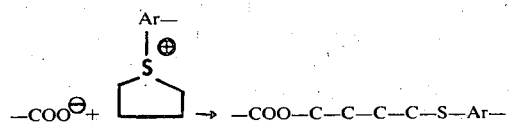

wherein each R independently is Cl, alkyl, alkoxy, phenyl, phenoxy or the like; each R' is independently H, Cl, alkyl, alkoxy, phenyl or phenoxy; Z is a linking element which may be a chemical bond, O, S, alkylene or alkylenedioxy, wherein said alkylene moieties may be interrupted by O, S, phenylene or the like; $m$ is 0–3, $n$ is 0 to about 4, $p$ is 2 or 3 and X is a neutralizing anion.

If the sulfonium compound is monofunctional, i.e., if $n = 0$ in the above formula, the skeletal structure of the polymer is not greatly altered, e.g., it remains soluble and thermoplastic. When a polysulfonium compound is used ($n \geq 1$), the carboxy-containing polymer is cross-linked thereby and the polymer becomes insoluble and infusible. All gradations of these effects can be obtained by varying the ratio of sulfonium groups to carboxy groups in the two reactants. Thus, the invention includes the process of diminishing the hydrophylic nature of a carboxy-containing polymer by treatment with the above sulfonium compounds and the compositions comprising such polymers in combination with such sulfonium compounds.

DETAILED DESCRIPTION OF THE INVENTION

Any of the sulfonium compounds of Formula I will react with a carboxy-containing polymer, with resultant attachment of the sulfonium compound to the polymer, thus masking the carboxy group and diminishing the hydrophilic nature of the polymer. The reaction apparently involves opening of the sulfonium ring and formation of an ester of the carboxy group:

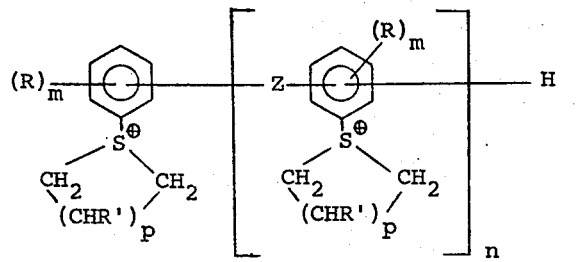

wherein Ar represents an aromatic moiety which may or may not be attached to another similar aromatic moiety. The same ring-opening reaction occurs when the sulfonium ring is a six-membered ring. If the sulfonium compound contains two or more sulfonium rings it will function as a cross-linker and thus render the carboxy-containing resin insoluble and infusible if used in sufficient amount. Thus, one chooses a mono- or a polysulfonium compound for combination with a particular carboxy-containing polymer, depending on whether the object is to cross-link the polymer or merely to diminish its hydrophylic properties without rendering it insoluble and infusible.

Among the monosulfonium compounds of Formula I, the preferred species are those in which the aromatic ring attached to the S atom bears one or more hydrocarbon substituents, i.e., $m$ is 1 or 2 and R is alkyl or phenyl. The prefered alkyl groups are the tert.-alkyl groups, particularly tert.-butyl. The presence of such groups increases the hydrophobic nature of the thus modified carboxy-containing resin.

Among the polysulfonium compounds of Formula I, the preferred species are those in which R is alkoxy, particularly methoxy, or R is not present, i.e., $m = 0$. Those wherein R is alkoxy are conveniently made from the corresponding zwitterionic compounds disclosed in U.S. Pat. No. 3,660,431 by reaction with a strong alkylating agent, such as dimethyl sulfate. The same method can be used to made monosulfonium compounds wherein one R is alkoxy by similarly etherifying the zwitterionic compounds disclosed in U.S. Pat. No. 3,636,052.

In both the mono- and the polysulfonium compounds, the preferred species are those wherein the sulfonium ring is a 5-membered ring, i.e., $p = 2$. Particularly preferred are those wherein R' is H.

As set forth in the reference set forth hereinbefore, there are two general methods for making the sulfonium compounds useful in practicing the invention:

1. A phenol or polyphenolic compound, such as a novolac resin, having at least one activated hydrogen atom in a position ortho or para to a phenolic hydroxyl group, is condensed with a cycloaliphatic sulfide, such as tetrahydrothiophene or hexahydrothiopyran, thus producing a zwitterionic compound of the type disclosed in U.S. Pat. Nos. 3,636,052 and 3,660,431. These can then be etherified, as by reaction with dialkyl sulfate, to produce the compounds of Formula I wherein at least one R is alkoxy.

2. A mono- or polythiophenol is condensed with a difunctional alkylating agent wherein the two displaceable groups are separated by 4 or 5 carbon atoms, such as tetramethylene or pentamethylene bromide, 4-bromobutanol, 5-chloropentanol, etc. When using the haloalkanols, the halogen is displaced first to produce a hydroxyalkyl thioether. The ring is then closed by the use of an arylsulfonyl chloride or chlorosulfonic acid.

Carboxy-containing resins useful in the practice of the invention are well known and many are readily available. In general, they contain a proportion of carboxy groups sufficient to render them soluble or self-dispersible in aqueous alkaline media. They are commonly used as their alkali metal or ammonium salts. The latter are preferred because if the carbonate or bicarbonate of the sulfonium compound is reacted with the ammonium salt of the resin, the by-product of the reaction is ammonium carbonate or bicarbonate. These are unstable salts and they decompose to produce only volatile by-products, thus being eliminated from surface coatings or other thin sections of the treated resin.

Among the well-known carboxy-containing resins are the copolymers of acrylic, methacrylic, maleic or itaconic acid with acrylic or methacrylic esters, acrylonitrile, methacrylonitrile, styrene, vinyl esters, butadiene, ethylene, propylene, or other polymerizable unsaturated monomers or mixtures thereof. While such polymers may contain any proportion of carboxy groups, they typically contain about 2–20% by weight of the carboxy-containing monomer unit and have a carboxy equivalent weight of about 100–2000.

Since the carboxy content of the resin can be varied widely, and since the proportion of carboxy groups that are reacted with sulfonium groups in practicing the invention can likewise be varied widely, it is apparent that the invention is capable of great variation in the proportions of reactants and in the corresponding degree of modification of the polymer that results therefrom. While the greatest hydrophobing and/or cross-linking effect is produced when a resin containing a high proportion of carboxy groups is reacted with at least a stoichiometric amount of a polysulfonium compound, a very substantial effect is produced with much less sulfonium compound, especially when the desired effect is cross-linkage and insolubilization. Such effect can often be achieved by use of only enough polysulfonium compound to produce one cross-link per 5000 equivalent weight of resin. Thus, one gram mole of a disulfonium compound might be sufficient for 10,000 g. of resin.

In practicing the invention, it is ordinarily sufficient to contact the carboxy-containing polymer with the sulfonium compound. While the reaction between them normally occurs within, at most, a few hours at room temperature, it can, of course, be accelerated by application of heat, e.g., 80°C. for 10 minutes. In order to obtain the necessary intimate contact and desirable uniformity of mixing of the two components, it is usually preferred to dissolve each in a suitable solvent and then mix the two solutions. While the preferred solvent is water, organic solvents, such as alcohol, dioxane, lower alkyl ethers of ethylene and propylene glycols and the like, may be used.

Although the carboxy-containing resin and the sulfonium compound in coatings and films cast from solutions or dispersions thereof quickly react after evaporation of the solvent, it has been noted that, surprisingly, such solutions or dispersions are far more stable. In fact, many of them can be stored in closed containers for many months without significant reaction or deterioration. Such stability is greatest when the ratio of sulfonium groups to carboxy groups does not exceed about 0.5.

SPECIFIC EMBODIMENTS OF THE INVENTION

The following examples illustrate the practice of the invention.

In a first series of experiments, various sulfonium compounds were incorporated into an aqueous solution of a carboxy-containing copolymer and the proportion of sulfonium compound required to impart water resistance to a coating made from the copolymer was determined. The copolymer contained 12% by weight of acrylic acid and 88% of methyl methacrylate and was used as an aqueous solution containing excess ammonia, the solids content, based on ammonium salt being 15% by weight.

The water resistance of the coatings, as applied to a sheet of clear polymethyl methacrylate, was determined by immersing the specimens in water for 72 hours and noting the visible effect. The coating was rated water-resistant only if it did not loosen from the substrate nor show visible swelling, clouding or other obvious indication of water sensitivity. The control films, containing no sulfonium compound, dissolved completely in a few minutes.

Table I summarizes the results in terms of (a) the minimum ratio of sulfonium groups to carboxyl groups and (b) the minimum weight ratio of sulfonium compound to carboxy-containing copolymer required to render the coating insensitive to water. All of the specimens were heated at 80°C. for 10 minutes and then held at room temperature for 12 hours before being tested. The sulfonium compounds were used in the form of their bicarbonate salts.

TABLE I

| Ex. No. | Sulfonium Cpd. | Minimum Amt. of Sulfonium Cpd. | |
|---|---|---|---|
| | | Ratio, Sulfonium/Carboxyl | Wt. % Sulfonium |
| 1 | phenyl-S⁺(tetramethylene) | 1.0 | 22 |
| 2 | CH₃-phenyl-S⁺(tetramethylene) | .25 | 7 |
| 3 | (CH₃)₃C-phenyl-S⁺(tetramethylene) | .25 | 8 |
| 4 | naphthyl-S⁺(tetramethylene) | 1.0* | 26* |

*Not completely insensitive.

A second set of experiments was run as described above except that the carboxy-containing resin was a terpolymer of (by weight) 8% acrylic acid, 46% butyl acrylate and 46% methyl methacrylate. Results are shown in the following table.

As is exemplified by Example 8, the polyfunctional sulfonium compounds are far more effective than are the monofunctional ones. However, the latter are preferred for those applications where it is desired to avoid cross-linking the polymer.

TABLE II

| Ex. No. | Sulfonium Cpd. | Minimum Amt. of Sulfonium Cpd. | |
|---|---|---|---|
| | | Ratio, Sulfonium/Carboxyl | Wt. % Sulfonium |
| 5 | phenyl-S⁺(tetramethylene) | 0.50 | 7.6 |
| 6 | CH₃-phenyl-S⁺(tetramethylene) | .25 | 4.0 |
| 7 | (CH₃)₃C-phenyl-S⁺(tetramethylene) | .20 | 4.7 |
| 8 | (tetramethylene)S⁺-phenyl-O-phenyl-S⁺(tetramethylene) | .10 | 1.5 |

The following table shows a variety of sulfonium compounds that are useful in practicing the invention and that can be made and used in essentially the manner used for those in the above examples.

TABLE III

| Example | Compound |
|---|---|
| 9 | $C_8H_{17}$–C₆H₄–S⁺(cyclic)–$C_2H_5$   $OH^⊖$ |
| 10 | $C_5H_{11}O$–C₆H₃($CH_3$)–S⁺(cyclic)   $HSO_4^⊖$ |
| 11 | $C_6H_5O$–C₆H₄–S⁺(dimethyl cyclic)   $Cl^⊖$ |
| 12 | $CH_3O$–C₆H₃(Cl)–S⁺(cyclic)–$C_6H_5$   $HCO_3^⊖$ |
| 13 | [$OCH_3$–C₆H₃–S⁺(cyclic)–$CH_2$–C₆H₃($OCH_3$)–S⁺(cyclic)]–H   $4\ HCO_3^⊖$ |
| 14 | [C₆H₄–S⁺(cyclic)–O–C₆H₄–S⁺(cyclic)]₂–H   $3\ OH^⊖$ |
| 15 | C₆H₄–S⁺(cyclic)–$OCH_2CH_2O$–C₆H₄–S⁺(cyclic)   $2\ HCO_3$ |

TABLE III – Continued

| Example | Compound |
|---|---|
| 16 | C₆H₄–S⁺(cyclic)–$CH_2C_6H_4CH_2$–C₆H₄–S⁺(cyclic)   $SO_4^⊖$ |
| 17 | C₆H₄–S⁺(cyclic)–$OCH_2CH_2OCH_2CH_2O$–C₆H₄–S⁺(cyclic)   $2\ OH^⊖$ |
| 18 | $C_9H_{19}$–C₆H₄–S⁺(cyclic)–$C_6H_5$   $HCO_3^⊖$ |
| 19 | C₆H₄($CH_3$)–S⁺(cyclic)   $HSO_4^⊖$ |
| 20 | $(CH_3)_3C$–C₆H₄–S⁺(cyclic, OH, OH)   $HCO_3^⊖$ |
| 21 | $(CH_3)_3C$–C₆H₄–S⁺(cyclic)–$CH_3$   $Cl^⊖$ |
| 22 | naphthyl–S⁺(cyclic)   $OH^⊖$ |
| 23 | $(CH_3)_3C$–C₆H₄–S⁺(cyclic)   $HSO_4^⊖$ |
| 24 | (cyclic)S⁺–C₆H₄–C₆H₄–S⁺(cyclic)   $2\ OH^⊖$ |
| 25 | (cyclic)S⁺–C₆H₄–$O(CH_2)_4O$–C₆H₄–S⁺(cyclic)   $2\ HCO_3^⊖$ |

We claim:

1. The method of reducing the water sensitivity of a carboxy-containing polymer comprising reacting by contacting the polymer with a sulfonium compound of the formula

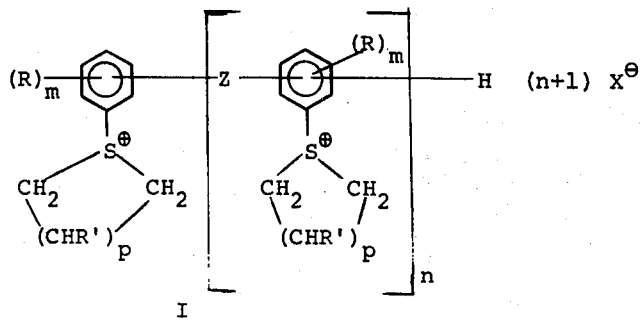

I wherein each R independently is Cl, alkyl, alkoxy, phenyl, phenoxy; each R' is independently H, Cl, alkyl, alkoxy, phenyl or phenoxy; Z is a linking element which may be a chemical bond, O, S, alkylene or alkylenedioxy, wherein said alkylene moieties may be interrupted by O, S, phenylene or the like; $m$ is 0–3, $n$ is 0 to about 4, $p$ is 2 or 3 and X is a neutralizing anion.

2. The method of claim 1 wherein the polymer is a copolymer of acrylic, methacrylic, maleic or itaconic acid with at least one other unsaturated monomer copolymerizable therewith.

3. The method of claim 1 where, in Formula I, $n$ is zero.

4. The method of claim 1 where, in Formula I, $n$ is 1–2.

5. The method of claim 1 where, in Formula I, $m$ is zero.

6. The method of claim 1 where, in Formula I, $p$ is 2.

7. The method of claim 1 wherein the reaction is conducted at a temperature not exceeding about 80°C.

8. The composition of matter comprising an aqueous solution of a carboxy-containing polymer and an amount of a compound of Formula I sufficient to reduce the water sensitivity of said polymer when reacted therewith.

* * * * *